June 19, 1956 B. A. SCHWARZ 2,751,503

SOLENOID POWERED TUNER

Filed Feb. 27, 1952 4 Sheets-Sheet 1

Inventor
Bertram A. Schwarz

By Willits, Helwig & Baillio
Attorneys

June 19, 1956 B. A. SCHWARZ 2,751,503

SOLENOID POWERED TUNER

Filed Feb. 27, 1952 4 Sheets-Sheet 2

Inventor

Bertram A. Schwarz

By Willits, Helwig & Baillio

Attorneys

June 19, 1956 B. A. SCHWARZ 2,751,503

SOLENOID POWERED TUNER

Filed Feb. 27, 1952 4 Sheets-Sheet 3

Inventor
Bertram A. Schwarz
By Willits, Helwig & Baillio
Attorneys

June 19, 1956 B. A. SCHWARZ 2,751,503

SOLENOID POWERED TUNER

Filed Feb. 27, 1952 4 Sheets-Sheet 4

Inventor
Bertram A. Schwarz

By Willits, Helwig & Baillio

Attorneys

United States Patent Office 2,751,503

Patented June 19, 1956

2,751,503

SOLENOID POWERED TUNER

Bertram A. Schwarz, Kokomo, Ind., assignor to General Motors Corporation, Detroit, Mich., a corporation of Delaware Application February 27, 1952, Serial No. 273,730

13 Claims. (Cl. 250—40)

My invention relates to automatic indexing means and more particularly to automatic tuning means for radio receiving apparatus which is indexed to a desired station by the appearance of the transmitted signal in the receiving apparatus.

The early radio receiving sets were tuned over the frequency band for which they were designed by the manual movement of a knob or similar device. Later while some manual tuning means was still provided there was added so-called "push button" tuning. This usually included some type of presettable means that upon actuation would quickly tune in a given predetermined station. However, some means had to be initially adjusted, such as an adjustable cam or stop, but once set it always tuned in that particular frequency when actuated. Any mechanically actuated and locked device, however, over an extended period of time, may move slightly due to repeated actuation, temperature changes, etc., and the electrical components of the receiver also may vary slightly over a time period, all of which may detune a desired station a small amount and necessitate resetting of the means. Furthermore if the locale of the radio receiver is changed, then each of the push button assemblies must be adjusted to a new group of stations. When the receiver is mounted on an automotive vehicle the locale may be changed rather frequently, necessitating such resetting if the push buttons are to be used.

There is also tuning means for radio receiving apparatus termed "signal actuated" tuning means. In this type of tuner, means is provided to drive the tuner across the band and upon the appearance of a signal from a transmitter in the amplifier, a control pulse triggers a stopping means to stop on that station. This type of tuner requires no presetting and is accurate due to the fact that the resonance of the signal provides the indexing pulse.

It is an object of my invention to provide a novel type of signal actuated tuning means for radio receiving apparatus.

It is a further object of my invention to provide a signal actuated tuning means for radio receiving apparatus in which a novel driving means is utilized to scan the band.

It is a still further object of my invention to provide a solenoid drive for the tuner to cause it to scan the band, said drive being accomplished by a plurality of short strokes which permits the use of a relatively small solenoid. The mass of the driven parts of the tuning means is sufficient to provide inertia drive during momentary recocking periods of the solenoid and no noticeable hesitation occurs.

It is a still further object of my invention to provide a simple, economical and rugged device for automatically tuning a radio receiver to index on the receipt of incoming signals which requires no presetting or adjusting of the same.

With the above and other objects in view my invention will be best understood by an examination of the following specification and claims and the illustrations of the accompanying drawings in which:

Figure 3:
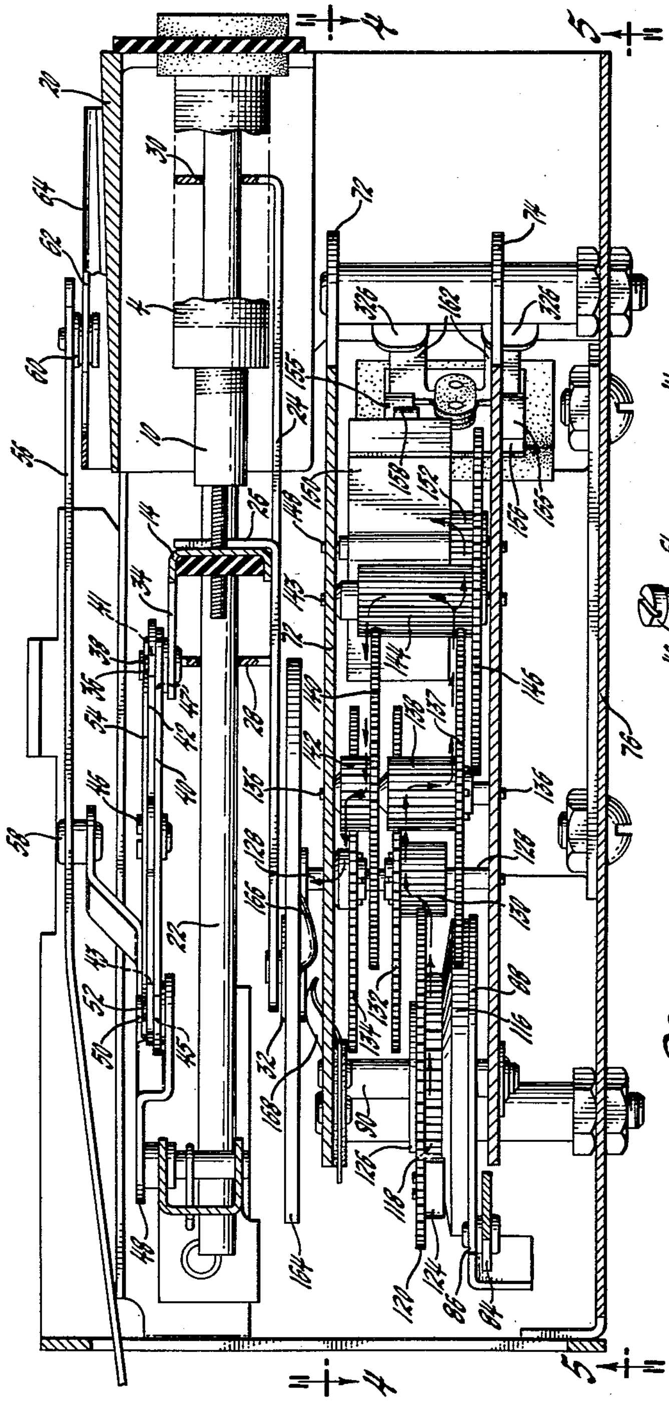
Figure 3 is an enlarged longitudinal sectional view taken on the line 3—3 of Figure 2 in the direction of the arrows.
Figure 3A:
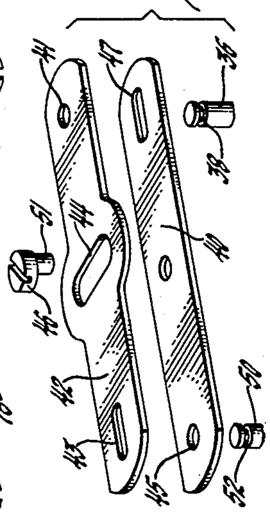

Figure 3*a* is an exploded perspective view of a connecting linkage.

Figure 1:
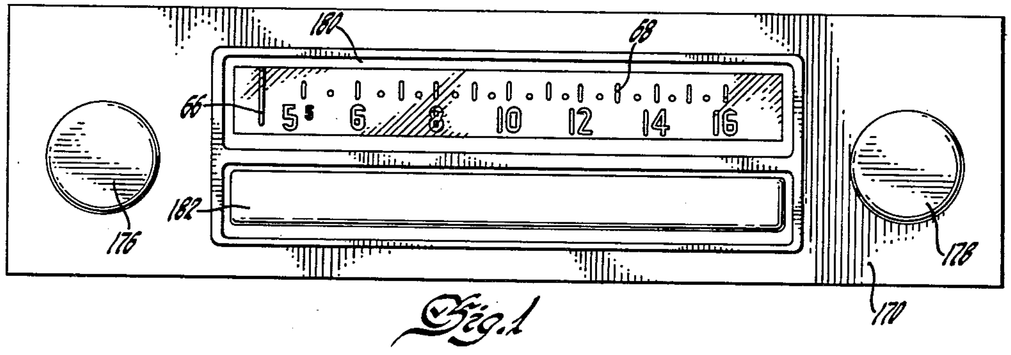
Figure 1 is a front elevation of a tuning means embodying my invention.
Figure 2:
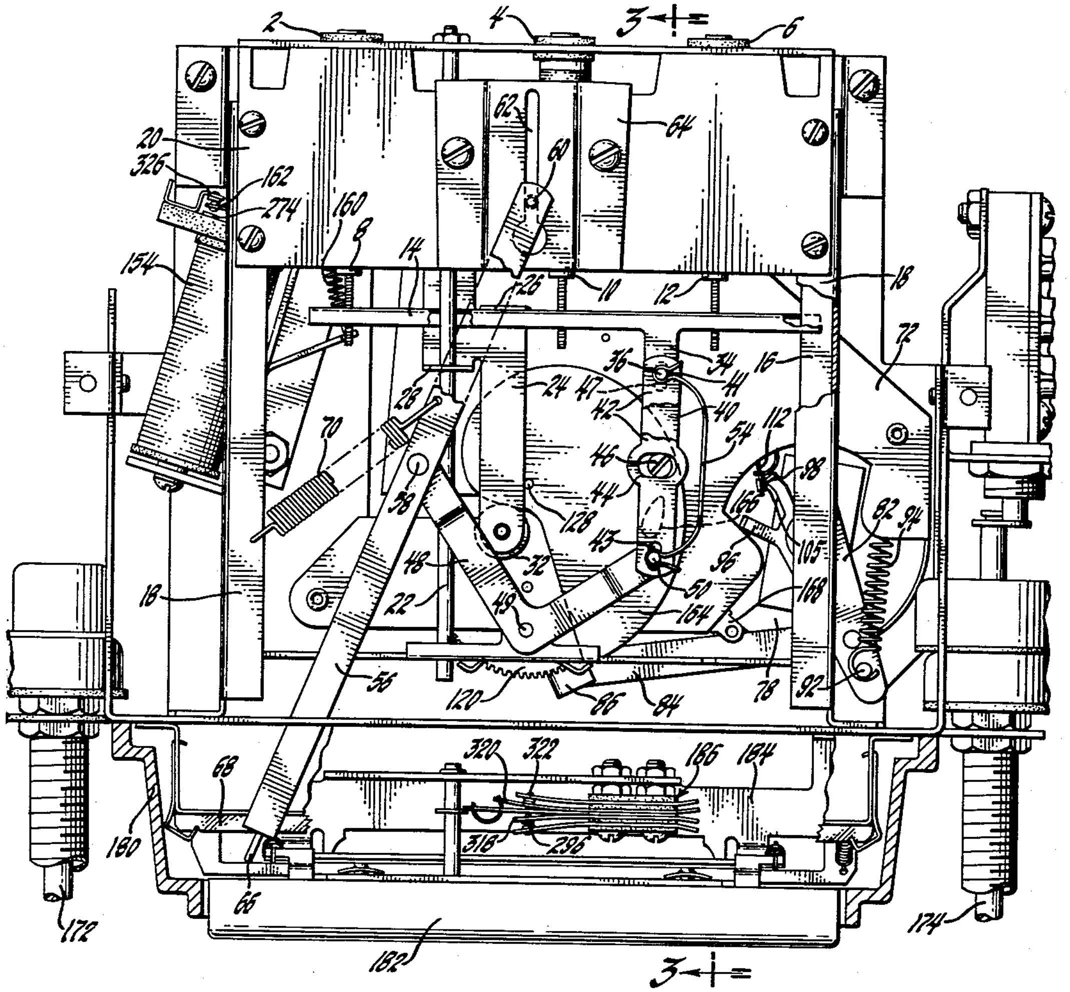
Figure 2 is a top plan view of the tuning means, parts being broken away and shown in section.
Figure 4:
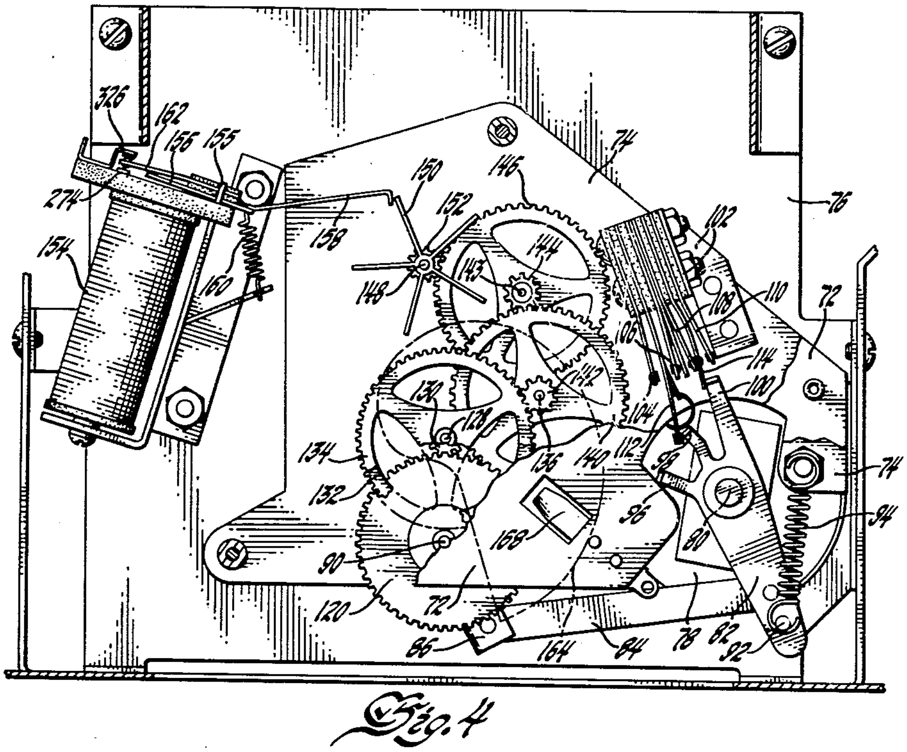
Figure 5:
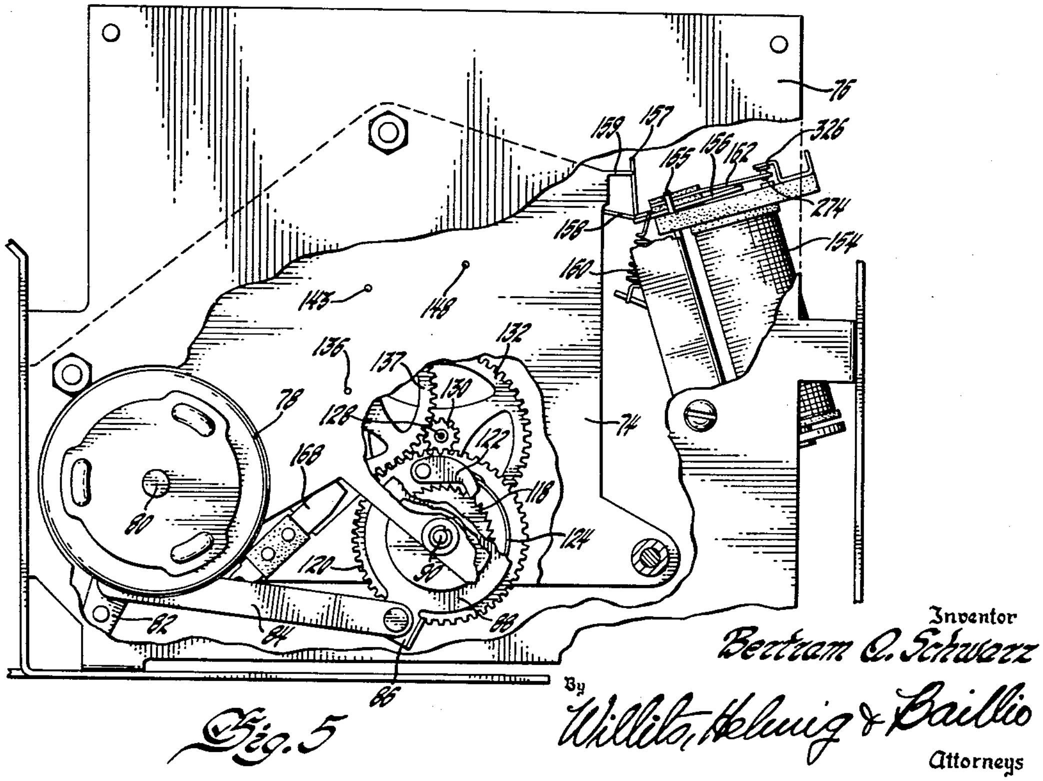
Figure 6:
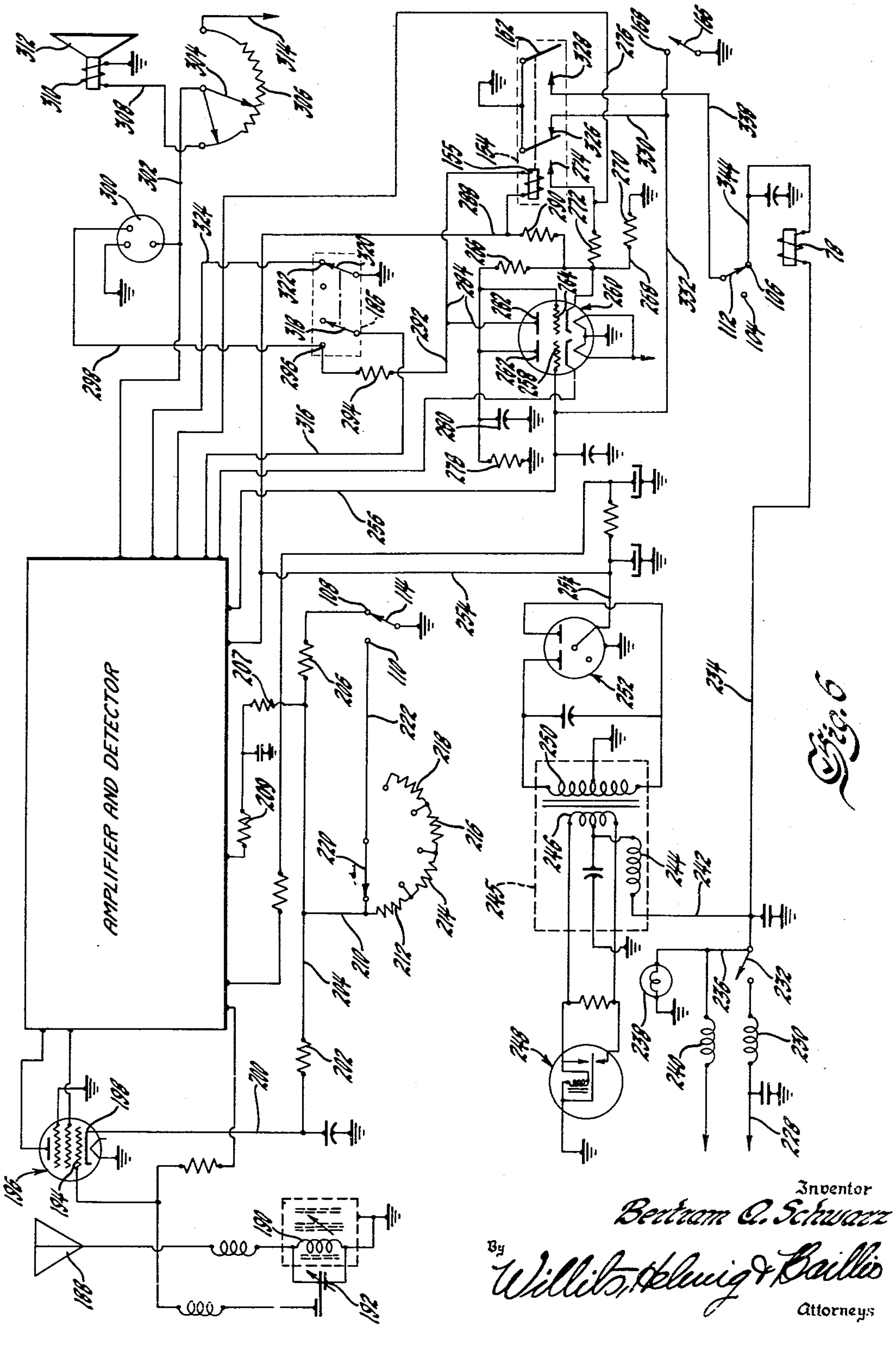

Figure 4 is a sectional view taken on the line 4—4 of Figure 3 in the direction of the arrows but of the same scale as Figure 2;

Figure 5 is a bottom plan view taken on the line 5—5 of Figure 3 and to the same scale as Figure 2; and Figure 6 is a schematic circuit diagram of a radio receiver and tuning means for controlling the same embodying my invention.

In tuning a radio receiver either the inductance or capacitance of the resonant circuits may be varied. In the present device there is shown variable inductance means for tuning or permeability tuning. My invention could be applied to variable capacity tuning means as well. The tuning means per se consists of a plurality of coils 2, 4 and 6 which are connected in the antenna, oscillator and radio frequency circuits of the receiver. The inductance of each coil is changed by the insertion or withdrawal of associated powdered iron cores 8, 10 and 12, all of which are mounted on a common transverse bar 14 which is mounted to move longitudinally of the frame. An open slot is cut in one end of the bar 14 and straddles a flange on rail 16, fixedly mounted on the box frame 18. The coils 2, 4 and 6 are fixedly secured to a plate 20 mounted across the frame.

A longitudinal rod 22 is mounted in the front and rear frame members and extends through an opening in the bar 14 to support the opposite side thereof and act as a second rail upon which the bar can move. A flat member 24 with offset portions is rigidly secured to the bar 14 and has an upstanding flange 26 at the inner end of one offset portion and upstanding flanges 28 and 30 at opposite ends of the other offset portion. Flange 26 is secured to the bar 14 and spaced flanges 28 and 30 are aligned and provided with openings through which the rod 22 extends. The assembly of the bar 14 and member 24 actually forms a sliding carriage on which the tuning cores are carried. The front portion of member 24 extends forwardly approximately in the center of the tuner and has rotatably mounted on its lower face at the end a flat roller 32. This roller acts as a cam follower to drive the carriage.

A tongue 34 extends forward from the top edge of bar 14 and carries at its outer end a small stud 36 having a peripheral groove 38 adjacent its upper end. A pair of elongated flat members 40 and 42 lying one above the other which have aligned openings at each end, form a composite adjustable connecting link. The upper member 42 has a circular opening 41 at one end to fit over stud 36 and an elongated opening 43 at the opposite end. The lower member 40 has a circular opening 45 at the end adjacent the elongated opening 43 of the upper member and a similar elongated opening 47 in the opposite end adjacent the circular opening 41. The upper member 42 has a central transverse slot 44 therein and a rivet 51 frictionally mounted into the lower member 40 and having a slotted eccentric head 46 lying in the slot 44 provides relative longitudinal adjustment of the parts and thus the effective length of the link may be varied. A bell crank lever 48 is pivotally mounted on the front frame cross member through a pin 49. One arm of the bell crank has a short stud 50 mounted adjacent the end. The link assembly formed of members 40 and 42 is placed upon the two short studs 36 and 50 to interconnect the bell crank 48 and the bar 14. The studs are sufficiently long to project through the two members 40 and 42 and stud 50 is likewise provided with a groove 52 adjacent its upper end. A retaining spring 54 snaps into the two grooves 38 and 52 to hold the assembly together and reduce lost motion in the linkage.

A straight lever 56 is pivotally connected to the other end of the bell crank lever 48 by pin 58. The rear end of the lever 56 carries a small pin 60 projecting downwardly which engages and rides in slot 62 in a plate 64 mounted on top of plate 20. This acts as a sliding pivot for the lever 56 so that the front portion may trace a substantially straight line as it is moved by the bell crank 48. The front end of the lever 56 carries a needle 66 which extends downwardly in front of a dial plate 68 carried by the front of the frame. Thus as the member 24 and bar 14 move in or out to tune the receiver, the needle 66 indicates its position and the frequency to which it is tuned. The needle 66 may be initially adjusted to the proper position on the dial by turning screw 46 to vary the link 40—42 until the needle aligns properly. A tension spring 70 has one end anchored to the frame 18 and the other end connected to the lever 56 behind its pivotal connection 58. This biases the lever 56 to the left as seen in Figure 2 and also biases the bar 14 to its rearmost position.

The means for driving the tuning means consists generally of a solenoid 78 mounted on the bottom of the frame that, when energized, drives a gear train and through it a cam 164 and an air vane governor 150 to limit the speed and also to act as a stopping means when a detent is placed in its path. The cam has a spiral shape with a quick return to drive the bar 14 and member 24 out slowly and then permit the spring 70 to quickly return them to their innermost position upon continued cam rotation so that they can recycle.

A pair of supporting plates 72 and 74 are mounted in spaced relation on the base 76 of the box frame to carry the gears, cam and governor. The solenoid 78 is a flat circular type having a central shaft that is rotated upon energization of the solenoid. This solenoid is mounted on the lower plate 74, its shaft 80 projecting upwardly. Mounted on the shaft is a driving arm 82 which extends on both sides of the shaft and is rigidly secured to rotate therewith. The longer end of the driving arm has pivotally connected thereto a driving link 84 which is in turn pivotally connected to an extending lug 86 on disc 88 rotatably mounted on shaft 90, the latter being supported in vertical position between the plates 72 and 74. Beyond the pivot point between arm 82 and link 84 on the arm 82 is an anchor pin 92 and a tension bias spring 94 has one end secured thereto and the other end secured to the stationary plate 74. This provides a bias to return the solenoid arm to its initial position after each period of energization.

The opposite end of the driving arm 82 is provided with three spaced fingers 96, 98 and 100, each of which has an upturned end to provide desired switch actuating means. Mounted on the plate 74 is an angle bracket 102 carrying a plurality of alternate conductive arms and insulating wafers to form a plurality of switching means. The conductive arms extend toward the switch actuating fingers and four of these, 104, 106, 108 and 110 are provided with contacts adjacent the ends and form two pairs of switches. The conductive arms 112 and 114 are located between contacts 104 and 106 and 108 and 110 respectively. They are longer than the first four and are engageable by the fingers 96, 98 and 100 to force them against one set of contacts or the other. Arm 112 is insulated at the point of engagement by insulator 105.

The lowest disc 88 on the shaft 90 is as before mentioned mechanically connected to the solenoid drive and will be rotated when the solenoid is energized. It is rigidly secured to the next disc 116 on shaft 90, and rotates with the same. The disc 116 has fixedly secured to its upper surface a ratchet wheel 118 so that the two discs and wheel operate as a unit. Mounted next in order on the shaft 90 is a spur gear 120. On the lower face of the spur gear there is pivotally mounted a pawl 122. A leaf spring 124 is also mounted on this face of the spur gear to extend over the pawl and bias it inwardly toward the ratchet teeth. A washer 126 is mounted above the spur gear 120 and holds the assembly together on shaft 90.

Rotatably mounted in and extending between plates 72 and 74 is a shaft 128 on which is loosely mounted a pinion 130 and spur gear 132 secured together to rotate as a unit. In spaced relation on the same shaft but keyed thereto to rotate therewith is a further spur gear 134. A second spaced shaft 136 parallel to shaft 128 has mounted thereon a spur gear 137, a pinion 138, a spur gear 140 and a pinion 142; gear 137 and pinion 138 are keyed to rotate with the shaft while gear 140 and pinion 142 are free to rotate on the shaft, and the upper pinion meshes with spur gear 134 on shaft 128 to drive the same. The lower pinion 138 meshes with the spur gear 132 and is driven thereby. A further spaced shaft 143 mounted between plates 72 and 74 carries an axially long pinion 144 which meshes with both gear 137 and 140 and is driven thereby and also carries a spur gear 146. The loading gear train is completed by a final shaft 148 upon which is mounted a wind vane governor 150 and a pinion 152 for driving the same from gear 146.

The governor as well as acting to limit the speed of rotation of the cam 164 has an additional function in this case. This is to stop and lock the mechanism upon receipt of an incoming signal in the set. This is accomplished by the deenergization of the trigger or control relay 154, which includes an armature 156 mounted to rock about a pivot 155 and which carries a detent 158 biased into the path of the blades of the governor 150 by a spring 160. The relay 154 is energized during tuning periods and deenergized upon receipt of a signal. When it is energized it attracts its armature 156 to swing the detent 158 out of the path of the blades of the governor, permitting the governor to rotate and the tuner to scan. When the relay is deenergized, however, the spring 160 swings the detent into the path of the blades of the governor and stops the cam 164. The movement of the armature also actuates movable switch arm 162. Flow of driving power from the solenoid motor during the tuning stroke is transmitted through the gear train as shown by the heavy dotted line in Figure 3. Gear train speed is built up to pinion 144 and is then reduced back to the tuning cam 164. This is done to produce high rotational speed of the fly governor 150 for good speed regulation.

If pinion 130 were rigidly connected to shaft 128, then gear 132, pinion 138 and gear 137 would not be needed since the solenoid would drive directly through shaft 128 to the tuning cam. This additional gearing is added, however, to avoid detrimental tuning inaccuracies due to gear backlash while the receiver is on the listening position and the electrical power to the solenoid is turned off.

As a further explanation, assume that the fly governor 150 is positively stopped by the interfering detent 158 on the relay armature after an acceptable signal has been reached. If the power to the solenoid is discontinued, the gear train will tend to back up in direction due to spring bias of the tuning carriage against the spiral face of the tuning cam. This backing tendency will be resisted by the fly governor but not until backlash has been taken up between gear 146 and pinion 152. This amount of backlash on the high speed end of the gear train is not enough to be detrimental. Without the additional gearing mentioned above, backlash between gear 134 and pinion 142, gear 140 and pinion 144 would be realized which would be intolerable.

Fixed on the upper end of the shaft 128 is the cam 164. This cam engages the roller 32 on the end of the member 24 and as the cam rotates the carriage and tuning cores are moved toward the front of the tuner and out of the coils. The carriage reaches its most forward position as the tip of the cam moves under the roller and as soon as it has passed this point the carriage moves quickly to the rear under the action of the spring 70. On the undersurface of the cam 164 at one point there is a switching protuberance 166. This is adapted to engage an electrical contact 168 which is insulatedly mounted on plate 72. This completes an electric circuit for control purposes, as will be later described.

The receiving set is provided with a panel such as 170 through which the control shafts 172 and 174 project, having manually operable control knobs 176 and 178 thereon. A cover plate 180 fitting over the dial is secured to the panel. This plate also has a rectangular opening therein in which is mounted an actuator bar 182. This bar is mounted for reciprocating movement in the opening on a bracket 184 carried by the frame, and is biased outwardly. A multiple contact snapover switch 186 is actuated by the inward movement of the bar 182 and this action energizes the system to move to the next station.

In general, therefore, the operation may be described as follows. With the set energized, the operator pushes in on the actuator bar 182, which causes switching action of the switch 186, and through circuits to be described this energizes relay 154. Its armature 156 is attracted, which moves the detent 158 connected thereto out of the path of the wind vane governor 150 so that the same may rotate. At the same time the solenoid 78 is energized and it, therefore, applies a rotary motion to its shaft 80. This rotary motion is transmitted through driving arm 82 mounted on the shaft and connecting link 84 to disc 88 rotatably mounted on shaft 90. Through the friction face drive between disc 88 and disc 116 the latter is also rotated, turning ratchet wheel 118, which is fixedly connected to the disc 116. The rotation of the ratchet gear 118 through the pawl 122 drives the spur gear 120. Thence this rotary motion is transmitted to the wind vane governor 150 through the pinion 130, spur gear 132, pinion 138, spur gears 137, 140, pinion 144, spur gear 146 and pinion 152.

At the same time pinion 144 drives gear 140, pinion 142 and spur gear 134 to turn shaft 128, to which it is fixedly secured, and this turns the driving cam 164. Rotation of the cam 164 causes its spiral surface, which is in contact with the small wheel 32 on the member 24, to move the carriage forwardly, thus withdrawing the cores 8, 10 and 12 from the coils to tune the radio receiver from the lower frequency end of the band toward the higher. The gear train and governor act as a load or damping means so that the tuning action will be sufficiently slow and when the spiral cam 164 has brought the carriage to its outermost position, it is rapidly drawn back toward the point at which the cores are plunged within the coils very quickly by the spring 70. This spring also maintains the wheel 32 in contact with the face of the cam. Thus the cam 164 always rotates in the same direction and moves the tuning carriage slowly from a position at which the cores are fully plunged within the coils to one at which they are substantially withdrawn and then quickly returns them to their first position. The solenoid in this case has a relatively short stroke which is translated into rotary movement of the shaft 80, and it is incapable of driving the cam 164 through a complete rotation in one energization. It therefore is provided with limit switching means which in this instance are fingers 96 and 98 on the driving arm 82 which throw a limit switch 112 in opposite directions to periodically energize and deenergize the driving solenoid 78.

With this general description of the operation of the mechanical means thus far described, I shall now describe the electrical circuit associated therewith and of the receiving set of which it forms a part.

In Figure 6 there is shown a radio antenna 188 which is connected through a tuned circuit consisting of a variable inductance 190, such as the tuning means heretofore described, and a capacitance 192 to the control grid 194 of a radio frequency amplifier tube 196. The output of this tube 196 is connected directly to the amplifying and detecting stages of a conventional superheterodyne receiver that also includes control pulse generating means for indexing such as that shown in a copending application S. N. 141,063, filed January 28, 1950, in the name of James H. Guyton, assigned to a common assignee. The cathode 198 of the tube 196 is connected through line 200 to a resistor 202 and thence through line 204 to a second resistor 206. The opposite terminal of the resistor 206 is connected to the fixed terminal 108 of the switching means carried by the angle bracket 102. Line 204 is also connected to resistor 207 and thence through resistor 209 in series to the IF tube cathode (not shown) in the amplifying and detecting means. In addition, line 204 is connected to line 210, the other terminal of which is connected to a plurality of resistances 212, 214, 216 and 218 in series. Stationary contacts are connected between each of these resistances and these stationary contacts are engageable by a movable switch arm 220. This arm 220 is connected through line 222 to stationary contact 110 of the switching means carried by the angle bracket 102. The grounded switch arm 114 actuated by finger 100 on solenoid arm 82 may be moved into contact with either stationary contact 108 or 110.

A lead 228 is connected to a suitable source of power and also to one end of a coil 230, the opposite end of which is connected through a manual off/on switch 232 to line 234. Line 234 is also connected to line 236 which extends to an indicating lamp 238 to advise whether the set is in operation or not, and also to a choke coil 240, the opposite terminal of which supplies power to the heater circuits of the various tubes. Line 234 is also connected through line 242 and coil 244 to the center tap of the primary 246 of a transformer 245 for supplying power to the receiver. A vibrator 248, connected to the end terminals of the primary, provides interruptions in the D. C. current so that it may be transformed into higher voltages. The secondary 250 in inductive relation with the primary 246 is connected to a full-wave rectifier 252, the output thereof being applied to line 254 to supply power to the set.

Control pulses are provided to index the tuner to desired incoming stations and these pulses are in this case applied through any suitable means such as the system shown in the Guyton application previously referred to. The signal in this instance appears on line 256 which is directly connected to the control grid 258 of the first section of a double triode tube 260. The plate 262 of the first section is directly connected to the control grid 264 of the second section, and also to one end of a resistor 266, the opposite terminal of which is connected to line 268 and thence through resistor 270 to ground. Line 268 is also connected to a resistor 272 and thence to a stationary contact 274 of the relay switching means and also through line 276 back to the receiver. The plate 262 of the first section of the tube 260 is also connected through resistance 278 and condenser 280 in parallel to ground.

Plate 282 of the second triode section of the tube 260 is connected to line 284 which extends to one terminal of the control relay solenoid 155, the opposite terminal being connected through line 288 back to the power supply. A resistor 290 is connected across between lines 288 and 268. A tie line 292 interconnects line 284 with one terminal of a resistor 294, the opposite terminal of which is connected to stationary contact 296 of the initiating actuator switch 186 of the tuner. This contact is also connected to line 298 which extends to a plug-in socket 300 which can be used for additional remote control of the tuner. The output of the receiver is applied through line 302 to the movable contact 304 of a fader control and thence through a portion of the resistance 306 to line 308 connected with the actuating coil 310 of the loud speaker 312. The other terminal of the resistance 306 is connected through line 314 to a second remote speaker if desired, the position of the arm 304 determining the proportion of the output applied to each speaker. Line 316 is connected between the receiver and movable switch arm 318 of the initiating switch 186 and associated movable arm 320 of the same switch is grounded and engages stationary contact 322 which is connected to line 324 extending back to the receiver.

The movable armature 162 of the relay 154 has two portions, one of which oscillates between stationary contacts 274 and 326, the second portion either engaging or disengaged from stationary contact 328. The armature 162 is grounded. Stationary contact 326 is connected to line 330 which terminates in a second line 332, one end of which is directly connected to the control grid 258 of the duo-triode tube 260 and the opposite terminal extending to stationary contact 168 of the cam operated switch. The movable portion 166 cooperates with contact 168 to provide desired switching action and this movable arm 166 is grounded. Stationary contact 328 is connected through line 338 to movable switch arm 112 of the switching means carried by the angle bracket 102, which is moved back and forth as a limit switch by fingers 96 and 98. This arm 112 cooperates with stationary switching contact 106 which in turn is connected through line 344 to one terminal of the driving solenoid coil 78, the opposite terminal of which is connected to line 234.

Assuming now that the off/on switch 232 is closed and that the receiver is indexed for a particular station with the relay 154 deenergized so that its detent 158 locks the governor 150 against rotation, and that it is desired to move the tuner to another station, the operator therefore pushes inwardly on actuator bar 182 which moves the associated switches 318 and 320 to the left-hand position, closing contact between switch arm 318 and stationary contact 296. This completes a circuit for relay solenoid 155, energizing the same to attract its armature 162 and move detent 158 out of the path of the wind vane governor 150. At the same time it moves the switch arm 162 to remove the ground circuit for the grid 258 of the first section of the double triode 260 so that it may now operate, and to energize the drive solenoid 78.

Solenoid 78, therefore, through its linkage drive, applies power to the gear train, as previously explained, turning the wind vane governor, and at the same time turning the spiral cam 164 so that the tuning carriage is moved outwardly to tune the set over the band. If no station with a sufficiently strong signal is tuned in during the first stroke of the solenoid, the actuating finger 96 will open the limit switch 112 at the end of the stroke and thus deenergize the solenoid. The pawl 122 and ratchet 124 then permit the spring 94 to return the solenoid quickly to its initially deenergized position without affecting the gearing which connects the ratchet to the governor and the cam. As soon as the solenoid has been pulled back by the spring 94 to its deenergized position the finger 98 moves limit switch 112 in the opposite direction to engage the contact 106 and thus reenergize the solenoid 78 to initiate another stroke and continue driving action. There is sufficient inertia in the gear train to maintain a forward drive of the cam in the interval between forward strokes of the solenoid and therefore the outward movement of the cores 8, 10 and 12 is continuous despite the intermittent action of the solenoid. Thus the driving of the tuner over the band is accomplished by a plurality of relatively short strokes, but the recovery of the solenoid is so rapid that the inertia of the parts will carry the tuner forward so that the slight stoppage of driving force is unnoticeable.

As soon as a triggering signal is encountered, the grid 258 of the first section of the tube 260, which has been in a condition of low conductance, is now driven positive to permit a high conductance in this section. This causes the grid 264 of the second section to become more negative, cutting off conductance in that section and deenergizing the relay solenoid 155 to drop its armature. This permits the spring 160 to move the switch arm 162 to deenergize the solenoid 78 and project the detent 158 into the path of the blades of the governor 150 and thus immediately stop the movement of the cores 8, 10 and 12 precisely on station. When the tuner reaches its outermost position, it returns quickly to its innermost location due to the shape of the cam, and at that time closes the switch 166—168 to momentarily deenergize the triggering means so that no station will be tuned in during this back stroke. As soon as the carriage reaches its innermost position, this switch will open and the system will become reenergized.

That portion of the system consisting of the variable resistors 212, 214, 216 and 218 with the associated switching means 220 as well as switching means 114—110—108 and resistors 202, 207, 209 and 206 constitute sensitivity control means. By adjusting the switch arm 220, the sensitivity may be varied and the tuner can be regulated to stop on a large number of relatively weak station signals or only on a few strong station signals as desired. The other switch 114 automatically switches the set so that it will have different sensitivity during the "in tune" or "listening" period from that during the searching or tuning period. When the solenoid 78 is deenergized, the switch 114 is held in closed position upon stationary contact 108 by the finger 100 of rotary arm 82 spring biased to that position by spring 94. This provides the normal listening sensitivity of the set. As soon, however, as tuning starts and the arm 82 begins to rotate upon energization of the solenoid 78, the finger 100 moves away from the arm 114 and it moves out of contact with contact 108 and into engagement with contact 110 and will provide whatever degree of sensitivity for station selection is determined by the setting of switch arm 220. As soon as a station is indexed, the solenoid 78 will be deenergized and the spring 94 will return arm 82 to a position in which finger 100 will press arm 114 back into engagement with contact 108 to restore "listening" sensitivity. Limit switch 112 is so adjusted that while it is operative switch arm 114 is maintained in contact with contact point 110.

It will thus be evident that I have provided a relatively simple drive for scanning the tuning band of a radio receiver, which drive operates continuously in one direction to obtain repeated scanning movements of said band with a quick return motion.

I claim:

1. In tuning means for radio apparatus having variable impedance means to tune the same over a prescribed band, a movable carriage upon which the impedance means are mounted, cam means whose surface engages a portion of the carriage to cause the same to move, energizable means to drive the cam, driving means interconnecting the energizable means and the cam relay controlled stopping means engageable with a portion of the driving means between the energizable means and the cam to lock the same upon relay deenergization.

2. In radio receiving apparatus, a movable impedance means for tuning the apparatus over a prescribed frequency band, a reciprocating carriage upon which the impedance means is mounted, rotatable cam means whose surface engages a portion of the carriage to move the same, a source of power for driving said cam, a gear train interconnecting the power source and the cam and relay controlled indexing means engageable with a portion of the gear train between the source of power and the cam to lock the same.

3. In radio receiving apparatus, a movable impedance means for tuning the apparatus over a prescribed frequency band, a reciprocating carriage upon which the impedance means is mounted, rotatable cam means whose surface engages a portion of the carriage to move the same, a solenoid, a gear train interconnecting said solenoid and the cam to drive the latter when the solenoid is energized and a relay controlled detent engageable with a portion of the gear train to index the same.

4. In radio receiving apparatus, a movable impedance means for tuning the apparatus over a prescribed frequency band, a reciprocating carriage upon which the impedance means is mounted, rotatable cam means whose surface engages a portion of the carriage to move the same, an energizable solenoid, a multiplying gear train connected to the solenoid to be driven thereby having a high speed and a low speed end, said gear train including one-way driving means adjacent the low speed end so that upon successive solenoid strokes the gear train beyond the one-way drive will continue to move in the same direction, and coupling means between the gear train and the rotatable cam to drive the latter.

5. In radio receiving apparatus, a movable impedance means for tuning the apparatus over a prescribed frequency band, a reciprocating carriage upon which the impedance means is mounted, rotatable cam means whose surface engages a portion of the carriage to move the same, an energizable solenoid, a multiplying gear train connected to the solenoid to be driven thereby having a high speed and a low speed end, said gear train including one-way driving means adjacent the low speed end so that upon successive solenoid strokes the gear train beyond the one-way drive will continue to move in the same direction, coupling means between the gear train and the rotatable cam to drive the latter, and relay actuated stopping means engageable with the gear train to cause the latter to index and lock when engaged.

6. In tuning means for radio apparatus having variable impedance means to tune the apparatus over a prescribed band of frequency, a reciprocable carriage upon which the variable impedance means is mounted spring biased to one extremity of its travel, a rotary spiral, quick return cam whose cam surface engages the carriage to cause movement thereof against the spring bias as the cam rotates, the carriage moving at a relatively slow rate in one direction and rapidly in the opposite direction, reciprocating solenoid drive means connected to the cam to rotate the same, a multiplying gear train having a high speed and a low speed end interconnecting the solenoid drive means and the cam including a pawl and ratchet adjacent the low speed end of the train so that the cam will be driven in one direction as the solenoid drive reciprocates, a governor driven by the gear train and signal actuated relay means engageable with the governor to lock the same against rotation and thus lock the complete system for index when the solenoid is deenergized.

7. In tuning means for radio apparatus having variable impedance means to tune the apparatus over a prescribed band of frequency, a reciprocable carriage upon which the variable impedance means is mounted spring biased to one extremity of its travel, a rotary spiral, quick return cam whose cam surface engages the carriage to cause movement thereof against the spring bias as the cam rotates, the carriage moving at a relatively slow rate in one direction and rapidly in the opposite direction, reciprocating solenoid drive means connected to the cam to rotate the same, a multiplying gear train having a high speed and a low speed end interconnecting the solenoid drive means and the cam including a pawl and ratchet adjacent the low speed end of the train so that the cam will be driven in one direction as the solenoid drive reciprocates, a governor driven by the gear train, signal actuated relay means engageable with the governor to lock the same against rotation and thus lock the complete system for index when the relay is deenergized and switching means actuated by cam rotation in circuit with the signal actuated solenoid means to close to prevent deenergization of the solenoid means on back travel of the carriage.

8. In driving and indexing means, a movable part which moves over a predetermined path, a source of power, gearing means interconnecting said source of power and said movable part whereby said part may be moved along its path, indexing means engageable with an intermediate section of the gear train to lock the same, said gear train assembled to provide gear ratios to give an increase in rotational gear speed from the source of power to the indexing means and a reduction in gear speed from the indexing means to the movable part so that movement of the part due to backlash in the gear train will be minimized when the indexing means is in engagement and the power source is deenergized..

9. In tuning means for radio receiving apparatus having a variable impedance means for tuning the receiver over a predetermined band of frequencies, a reciprocating carriage on which the impedance varying means is mounted, means for biasing said carriage toward one end of its travel, rotatable cam means engaging said carriage to cause movement against said bias means and tune the receiver, driving means for the cam including a multiplying gear train having a low speed and a high speed end, the low speed end being connected to the driving means and the high speed end to the cam, indexing means engageable with an intermediate section of the gear train to lock the system, said gear train reducing backlash to an acceptable amount for tuning accuracy when the indexing means is in engagement and the driving means is deenergized due to the fact that only a part of the gear train is coupled between the indexing means and the cam.

10. In tuning means for radio receiving apparatus having a variable impedance means for tuning the receiver over a predetermined band of frequencies, a reciprocating carriage on which the impedance varying means is mounted, means for biasing said carriage toward one end of its travel, cam means engaging said carriage to cause movement against said bias means and tune the receiver, driving means for the cam including a multiplying gear train, indexing means engageable with an intermediate section of the gear train to lock the system, said gear train assembled to provide gear ratios to give an increase in rotational speed from the driving means to the indexing means and a reduction in gear speed from the indexing means to the cam so that backlash in the gear train will be minimized for tuning accuracy.

11. In tuning means for radio receiving apparatus having a variable impedance means for tuning the receiver over a predetermined band of frequencies, a reciprocating carriage on which the impedance varying means is mounted, means for biasing said carriage toward one end of its travel, rotatable cam means engaging said carriage to cause movement against said bias means and tune the receiver, driving means for the cam including a multiplying gear train, indexing means engageable with an intermediate section of the gear train to lock the system, said gear train assembled to provide gear ratios to give an increase in rotational speed from the driving means to the indexing means and a reduction from the indexing means to the cam so that backlash in the gear train will be minimized for tuning accuracy, and switching means to deenergize the driving means when the indexing means is locked.

12. In tuning means for radio receiving apparatus having a variable impedance means for tuning the receiver over a predetermined band of frequencies, a reciprocating carriage on which the impedance varying means is mounted, means for biasing said carriage toward one end of its travel, rotatable cam means engaging said carriage to cause movement against said bias means and tune the receiver, driving means, a gear train having one end connected to the driving means and a section for increasing the speed of the gears to an intermediate point and a section for decreasing the speed of the gears beyond the intermediate point, the remote end being connected to the cam to drive the same, indexing stopping means engageable with the intermediate point to lock the cam in position thus reducing backlash as only a portion of the gear train is included between the indexing stopping means and the cam means when the tuning means is in tune.

13. In tuning means for radio receiving apparatus having variable impedance means to tune the same over a prescribed band of a movable carriage upon which the impedance means is mounted, a rotatable cam means having a spiral contour whose surface is engageable with a portion of the carriage to move the same as the cam rotates, a reciprocating solenoid, a gear train having a speed increasing section and a speed reducing section, the low speed end of the speed increasing section being connected to the solenoid, a one-way drive incorporated in the connection between the solenoid and the gear train, means connecting the remote end of the gear train to the cam to drive the same, signal, actuated relay means engageable with an intermediate part of the gear train to lock the same upon receipt of a signal, a source of electrical power and switching means connected to the source and to the solenoid, said switching means being actuated by the solenoid to sequentially energize and deenergize the same to produce a plurality of short driving strokes to drive the gear train in one direction to tune the apparatus.

References Cited in the file of this patent

UNITED STATES PATENTS

| | | |
|---|---|---|
| 2,487,772 | Nicholson et al. | Nov. 8, 1949 |
| 2,499,573 | Dunn | Mar. 7, 1950 |
| 2,511,580 | Goodrich | June 13, 1950 |
| 2,541,018 | Andrews | Feb. 13, 1951 |
| 2,622,202 | Gierwiatowski | Dec. 16, 1952 |
| 2,652,494 | Guyton | Sept. 15, 1953 |